INVENTOR.
OTTO B. VETTER
BY
Zugelter & Zugelter
Attys.

May 14, 1957

O. B. VETTER 2,791,906

BOILER WATER GAUGES PROVIDING UNCORRECTED LEVEL INDICATIONS
AND LEVEL INDICATIONS CORRECTED FOR
DENSITY OF THE BOILER WATER

Filed Sept. 28, 1955

INVENTOR.
OTTO B. VETTER

BY
Zugelter & Zugelter
Attys.

United States Patent Office 2,791,906
Patented May 14, 1957

2,791,906

BOILER WATER GAUGES PROVIDING UNCORRECTED LEVEL INDICATIONS AND LEVEL INDICATIONS CORRECTED FOR DENSITY OF THE BOILER WATER

Otto B. Vetter, Irwin, Pa., assignor to Hagan Chemicals & Controls, Inc., a corporation of Pennsylvania Application September 28, 1955, Serial No. 537,197

6 Claims. (Cl. 73—291)

This invention relates to gauges for measuring liquid levels in vessels such as in the steam drums of steam boilers wherein the density of the liquid as well as the level of the liquid are variable.

In a boiler generating steam, the measurement of water level is usually made on the water in the steam drum. The water level varies with the steaming rate and with the closeness to which the supply rate of feed water to the boiler matches the rate at which steam leaves the boiler drum. Since the density of the water also changes with changes in the saturated water temperature corresponding to the saturated temperature of the steam at the pressure of the steam in the boiler, the correctness of the level determination depends upon both an accurate measure of the water level and its density.

An object of this invention is to provide a gauge which can be either indicating or recording or both, for measuring accurately the water level in a boiler and which takes into account and compensates for the density of the boiler water and the saturated temperature of the water corresponding to the temperature of the saturated steam at the boiler pressure.

A further object of the invention is to provide a gauge of the above type which can be located at some point remote from the region of the boiler drum and which incorporates mechanisms for automatically compensating for the level measurement as measured hydrostatically, and automatically compensating for the effects of density changes of the liquid, in order that a true level measurement may be obtained that is more precisely or substantially the same as that which would be indicated by a conventional water gauge glass column.

A properly installed gauge glass mounted at the same elevation as the boiler drum and having interconnecting conduits between the bottom of the drum and the bottom of the gauge glass, and between the top of the drum and the top of the gauge glass, will produce such a circulation in the gauge glass system and its connections that the temperature of the water within the gauge glass will be approximately the same as the temperature of the water in the boiler drum. In such a system properly installed, the steam vapor condenses in the upper interconnecting conduit. The upper conduit should have sufficient pitch downwardly so that the condensate will flow by gravity into the top of the gauge glass. Any hydrostatic difference thus resulting from the condensate collecting in the gauge column and the hydrostatic head of water in the drum will cause the water to circulate back into the drum at the bottom through the bottom interconnection. Thus, the temperature of the water in the gauge glass is maintained approximately at the same temperature as the temperature of the saturated steam in the boiler drum at the operating level. Therefore, level of water as seen in the gauge glass will closely approximate the level within the drum. This has heretofore been recognized as a standard basis of indicating the level of water in the drum. However, as the gauge glasses of large numbers of present-day boilers are placed in obscure locations, and because of the high steam pressures and temperatures generated, precautionary and safety measures are factors militating against the use of glass gauges.

Because of the limitations in the use of gauge glasses as above described on modern day boilers, the tendency has been toward the use of remote manometric devices employing manometric fluids which are heavier than water. These devices can be located at more convenient levels below the boiler drum. In such case the legs of the manometer are subjected to the difference in hydrostatic head between the bottom of the drum and in the steam space at the top of the drum. The manometric devices are affected by the density of the water and do not, therefore, give true level readings. For instance, the density of the water in the drum is approximately 60 pounds per cubic foot when the boiler pressure is zero p. s. i. gauge and the saturated temperature of the water corresponding to saturated steam temperature at that pressure is 212 degrees F. and approximately 39 pounds per cubic foot at 2000 p. s. i. gauge and at a saturated water temperature of 636 degrees F. Therefore, the manometric devices will not reflect true variations in the water level in the drum unless the manometric indications are manually corrected for variations in the density of the water and other minor factors which may be pertinent to a particular type of manometer or manometric gauge, as for example the type which relies on floats for actuating an external indicator or register of level.

A further object of this invention is to provide an accurate, reliable and conveniently installable gauge for measuring the true water level through all phases of boiler operation, namely from the time a boiler is put in service until it is taken out of service. Such a gauge may be equipped with a controlling device for controlling the boiler water level automatically, or for sounding alarms at low or abnormally high water levels.

A further object of the invention is to provide a gauge which makes it possible to observe an indication of the uncorrected level as measured, as well as the density of the water, so that the accuracy of the corrected level indication can be substantiated without taking the gauge out of service.

A still further object of the invention is to provide a gauge provided with means whereby adjustments may be made conveniently in accordance with any desired base density and range of water level encountered.

The above and other objects of the invention will in part be apparent and will in part be obvious to those of ordinary skill in the art to which the invention pertains from the following description taken in conjunction with the accompanying drawings.

Figure 1:
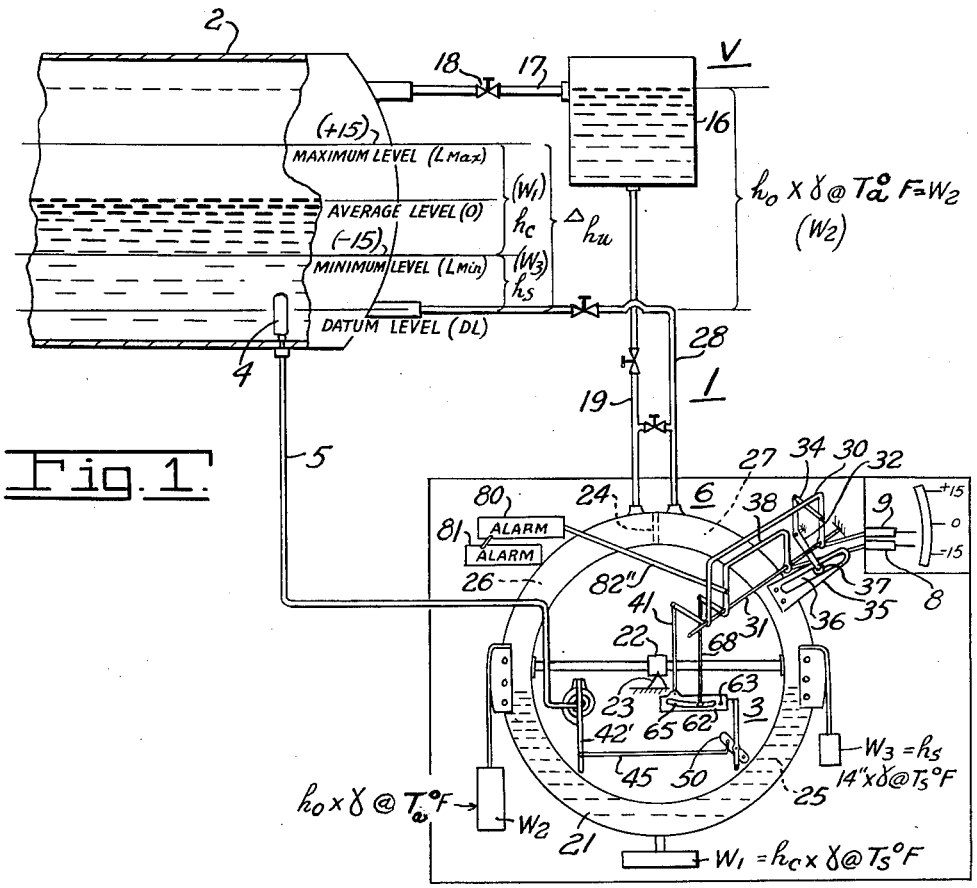
Figure 1 is a more or less diagrammatic view, partly in section, of a pressure vessel, such as the steam drum of a boiler, provided with a liquid level gauge embodying the invention.

In Fig. 1 of the drawings a gauge 1 embodying a form of the invention is so constructed and organized that it will measure uncorrected variable levels of liquid in a closed vessel, and true levels thereof. The true levels are the uncorrected levels corrected for changes in temperature and pressure of the liquid.

A specific embodiment of the invention is shown as applied to the measurement of water levels in the steam drum 2 of a boiler such as a water tube boiler for example. In the operation of such a boiler, the water level should never go below a datum level (DL), or should it rise higher than a predetermined maximum level (L max.). Preferably the feed water regulation should be such that the water level varies between a minimum level (L min.) and (L max.). The average level would lie between the levels (L max.) and (L min.). For convenience this average level is called the zero level; therefore the levels above and below the average level can be called plus (+) and minus (−) levels respectively. In practice L min. can be a fixed distance above datum, as for example fourteen inches, and a distance of (−15″) below zero or average operating level, and L max. can be (+15″) above the zero level.

The column heights corresponding to the above levels are indicated as $(h_s)$ or $(W_3)$, $(h_c)$ or $(W_1)$ and $\Delta h\mu$ which is $(h_s + h_c)$ or $(W_1 + W_3)$. $\Delta h\mu$ represents the change in water level above datum at any particular time as the operating level varies between (−15″) and (+15″).

There is also shown in Fig. 1 a column $(h_0)$ which is an artificially established constant head above datum. Column $(h_0)$ is maintained by a vessel V which is a part of the gauge mechanism 1.

The density of a liquid which is heated and undergoes fluctuations in pressure, varies with such temperature and pressure. The density relationship is retrogressive with rising temperatures and pressures. Therefore, a gauge that is uncorrected for change in density will show a level that is actually higher than the true level. The gauge of this invention is provided with means for correcting the uncorrected or apparent level to the true level.

Figure 3:
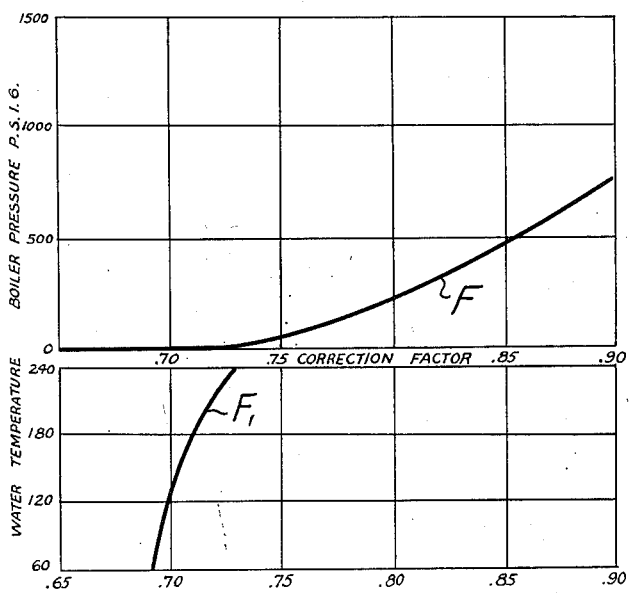
Fig. 3 is a graph showing the relation between pressure and temperature and correction factors corresponding to values of density of the liquid at various pressures and temperatures existing in the boiler.

The effect of pressure and temperature on the density of a boiler water, for example, is shown by Fig. 3. The abscissae of the two curves F and F₁ are in terms of correction factors. The correction factor at any temperature or pressure is a measure of the amount that the apparent level must be changed to obtain the true level reading by the gauge.

In view of the above, legends have been applied to Figure 1 as an aid to an understanding of the invention as described infra. The legend $\gamma$ is the density of the water at any temperature and pressure. For all practical purposes the temperature of a boiler water is equal to the temperature of the saturated steam at the pressure existing in the boiler at any moment. The saturated temperature in degrees F. is designated $T_s°$ F. Thus:

$$(h_0 \times \gamma) @ T_a° \text{ F.} = (W_2)$$

where $T_a$ is ambient temperature;

$$(h_c \times \gamma) @ T_s° \text{ F.} = (W_1)$$

where $T_s$ is saturated temperature at base operating conditions;

$$(h_s \times \gamma) @ T_s° \text{ F.} = (W_3)$$

and $$(h_c + h_s \times \gamma) @ T_s° \text{ F.} = (\Delta h\mu)$$

$\gamma$ is a measure of the correction factor as shown by curves F and F′ of Fig. 3, required to give the true level at any saturated temperature or corresponding pressure.

Figure 2:
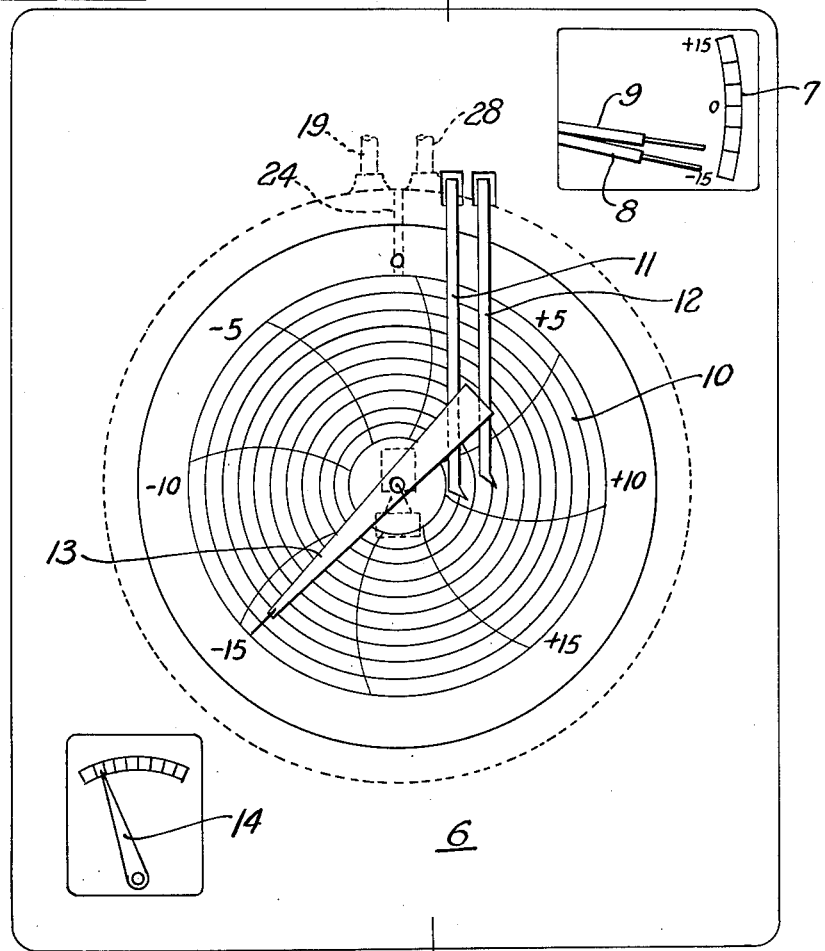
Fig. 2 is a front view of a meter embodied in the gauge.

Gauge 1 as stated is provided with means 3 for utilizing the correction factor to provide a true level reading or indication. The density change is detected by a device 4 located in the boiler at the datum level of the drum. Device 4 can be either a bulb containing a liquid that expands and contracts by and in accordance with temperature changes or a pressure responsive member that expands and contracts by and in accordance with changes in pressure at the datum level DL. For purposes of this application, device 4 can be regarded as a temperature responsive means. The temperature responsive liquid in bulb 4 is conducted to the gauge by a tube 5. In Fig. 2 is illustrated a front view of a meter 6 embodied in gauge 1. Meter 6 is provided with a check scale 7 with which uncorrected and corrected level pointers or indicators 8 and 9 register, a recording chart 10, on which uncorrected and corrected pen arms 11 and 12, respectively, trace the uncorrected and the corrected levels of water in drum 2, a sweep pointer 13 that operates through a relatively wide angle, say an angle of 270 degrees, and indicates the corrected levels in the drum in terms of minus and plus deviations from the average or zero level of Fig. 1. The meter also includes a pointer 14 which shows the changes in density of the water and provides an indication of the magnitude of the correction factor being applied in order to position the corrected pointers 9, 12, and 13 to positions that indicate true water level at any instant.

*Constant head device V*

The constant head device V comprises a closed container 16 located outside of but adjacent the boiler drum 2. The top of container 16 is above the water level L max. Container 16 is connected at a location near to but below the top thereof by a pipe 17 having therein a shut-off valve 18, to the drum 2 preferably to the steam space thereof at a point say approximately 14 inches or less above level L max. Pipe 17 should be pitched slightly downwards towards the drum. The bottom of the container 16 is connected by a pipe 19 to meter 6 which is located below the datum level DL.

Steam enters vessel 16 through pipe 17 and condenses, the condensate accumulating therein until it reaches the level of pipe 17. Any additional condensate forming drains through pipe 17 into drum 2, thereby automatically maintaining the head or column $h_0$ at a constant value. Since chamber 16 is in the ambient air adjacent the boiler setting, the temperature of the condensate in vessel 16 will for all practical purposes be equal to the ambient temperature. Variations in ambient temperature result in such small changes in density, they can be disregarded.

*Meter 6*

Meter 6 is a pressure differential responsive means. The form preferred and selected for illustration is the toroid type. As such it comprises a hollow toroid or ring 21 having a knife edge bearing block or way 22 supported on a knife edge bearing 23. The top of the ring is provided with an internal partition 24 against which the pressure difference $(W_2)$ minus $\Delta h\mu$ acts. The hollow of the ring contains a quantity of liquid 25 which with the partition forms two separated pressure receiving chambers 26 and 27. The liquid 25 is heavier than water and may be mercury for example. The liquid 25 has no frictional loss in its contact with the interior of the ring. The displacement of the liquid is not utilized directly in producing motion as the motion utilized is that given to the ring by the above mentioned pressure difference.

Pipe 19 is connected to the left hand chamber 26 of the ring while chamber 27 is connected by a pipe 28 to the boiler drum at the datum level. Therefore the maximum pressure difference acting on partition 24 occurs when the level of the water is at the datum level DL, and is equal to $(h_0 \times \gamma)$ at $T_a°$ F. At maximum differential the rotational force of $h_0$ on ring 21 is clockwise. As the water level rises from datum towards the maximum level L max. the differential decreases and the ring rotation is counterclockwise.

The rotational force exerted by $(h_0)$ maximum in a clockwise direction on ring 21 is countered by a counterweight $W_2$ that exerts a constant rotational force on the ring. The value of $W_2$ selected depends on the pressure and temperature relationship of the steam and water in the boiler drum in the operating range of pressures and levels encountered in normal operation of the boiler.

The ring is also provided with a counterweight ($W_3$) that produces a constant clockwise rotational force on the ring. The magnitude of weight ($W_3$) is one which corresponds to the weight of column ($h_s$) at the temperature and pressure conditions encountered in normal operation of the boiler.

A third counterweight ($W_1$) is attached to the bottom of the ring i. e. opposite the partition 24 and the magnitude or value of that weight is equal to column ($h_c$) under the normal operating conditions of the boiler. Weight ($W_1$) tends to urge the ring to a central position, it adds to the counterforce of weight ($W_3$) when the ring rotation is counterclockwise, and it adds to the counterrotational force of weight ($W_2$) when the ring rotation is clockwise.

The ring motion drives an uncorrected water level beam 30 to which one or more pen arms may be attached, depending on whether the meter is to be indicating only or indicating and recording. In this case both types of pointers are shown although both types need not be used in one and the same instrument.

Figure 5:
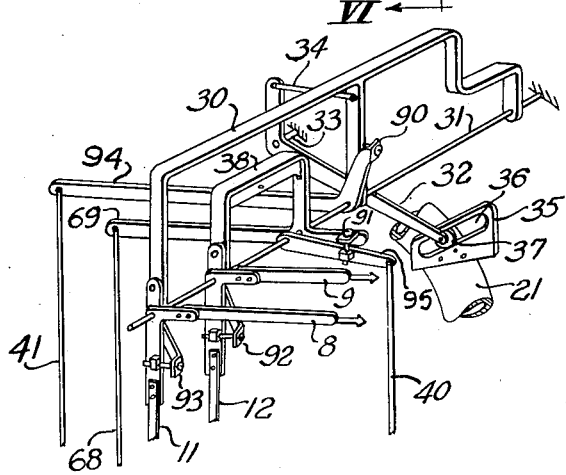
Fig. 5 is a diagrammatic view similar to a portion of Fig. 4, showing uncorrected and corrected pen arm beams and adjustments therefor.

Beam 30 is of inverted U-shape, and mounted on a support or bearing 31. In practice typical cone-point bearings may be employed as is customary in the instrument industry. As shown in Figs. 1 and 5, the uncorrected pointer 8 is connected to beam 30, while in Fig. 5 it is shown also that the uncorrected pen arm 11 is connected to that beam.

Rotation of ring 21 is imparted to beam 30 by means of a bell crank 32, rotatably mounted on a pin 33, a link 34 connecting one leg of the crank to beam 30 and a plate 35 secured to ring 21 and having therein a radial slot 36 located in the first quadrant of the ring, and in which slot a follower roller 37 is disposed. The follower roller is on the long leg of the bell crank 32.

When there is clockwise rotation of ring 21, roller 37 moves inwardly of slot 36 producing thereby clockwise rotation of bell crank 32, beam 30 and the pointers attached thereto. Roller 37 moves outwardly of slot 36 when there is counterclockwise rotation of ring 21 producing thereby counterclockwise rotation of bell crank 32, beam 30, and the pen and indicator arms attached thereto.

Meter 6 includes also a corrected beam 38 of inverted U-shape mounted to rotate about the same axis as beam 30 does. Beam 38 carries the corrected check level indicator 9, pen arm 12, and a link 40 that drives the corrected level sweep pointer 13, as will be explained infra.

The corrected beam 38, its check level pointer 9 and the drive link 40 are operated jointly by beam 30 through a drive link 41 and the density correction factor means 3.

The density correction factor means 3 comprises a pressure deflectable member 42 such as a Bourdon tube connected at its center or stationary end to tube 5. The outer or movable portion of tube 42 is connected to a lever 42' which is pivotally mounted on a pin 43 at the center of tube 42. Lever 42' is connected by a link 44 to the correction factor or density pointer 14 by a link 45 to a radial coupling 46. Coupling 46 has an output lever 46' that is positioned by and in accordance with the shape of either curve F or curve F', depending on whether the means 4 is pressure or temperature responsive. As shown, lever 42' has an adjustment 47 whereby the lever 42' may be properly zeroed.

Output lever 46' and link 41 operate jointly upon a compensating means 48 so that the corrected beam 38 and its pointer 9, pen arm 12 and drive link 40, will be actuated by and in accordance with the uncorrected level in the boiler corrected to true level.

The radial coupling comprises a rotatably supported shaft 49 having a slotted crank arm 50 fixed thereto. Link 45 is connected by a pin 51 to a block 52 which is slidably and adjustably mounted in the slot of arm 50 whereby the crank arm length R may be adjusted as needed. Mounted on shaft 49 is a crank member 53, to which a crank member 54 is secured by pins 55 at the adjacent ends of member 53 in spaced relation thereto. Member 54 has a slot 56 that passes through the center of shaft 49 extended in which a crank pin 57 is adjustably secured as shown. By means of the slot 56 and pin 57, the amplitude or throw of lever 46' and the direction of its motion with relation to the motion of crank 50, can be predetermined and preset.

Crank pin 57 operates in a slot 58 extending longitudinally of lever 46'. Thus the radial distance from pin 57 to the pivot pin 59 for lever 46' will vary as the shaft 49 rotates clockwise or counterclockwise. If pin 57 is above shaft 49 as shown, lever 46' will rotate or swing in the same direction as the rotation or swing of crank 50. If the pin 57 is below shaft 49, the motion of lever 46' will be opposite to the motion of crank 50. The upper or free end of lever 46' is connected by a cable 60 to the compensating means 48.

The compensating means 48 comprises a beam 62 of U-shape pivotally mounted on a bearing 63 at the end adjacent the free end of lever 46'. The flanges 64 of beam 62 are provided with downwardly curved slots 65 in which a roller 66 of a cross head 67 are guided. The free end portion of beam 62 is connected to drive link 41, and the cross head 67 is connected by a link 68 to crank arm 69 of corrected beam 38. The cross head 67 is urged toward the free end of beam 62 by a spring 70, one end of which is secured to the cross head and the other end to a pin 71 in the beam flanges. Cross head 67 is connected to cable 60, the effective length of which can be adjusted by a spool 72 on lever 46'.

The throw of corrected beam 38 and the links and the indicator and pen arms thereof, including drive link 40, is proportional to the rotational movement of beam 62 and the radial distance from roller 66 of the cross head to the center of the beam bearing 63. That radial distance is determined by the motion of the free end of arm 46' as fixed by the radial coupling 46 and the response of tube 42 to changes in the density of the boiler water as sensed by means 4.

The corrected or true level sweep pointer 13 is secured to a pinion 74 disposed coaxially with the center of rotation of ring 21. The pinion meshes with a gear segment 75 attached to a rotatable lever 76 to which the corrected beam drive link 40 is connected. The lever 76 may be slotted as shown to provide an adjustment 77 by which the point of connection of link 41 and lever 76 may be adjusted according to the angular sweep required of pointer 13.

The corrected beam 38 may also be utilized to actuate devices 80 and 81 for regulating the feed water supply to the boiler or for sounding low or high water level alarms. Device 80 may comprise a lever 82 rotatably mounted on a bearing 83 and counter-weighted as at 84. The lever 82 is connected to beam 38 by a link 82" and may be provided with an adjustably positioned pointer arm 85 having at one end a mercury switch 86. By means of an adjustment screw 87 the switch 86 may be positioned to either make or break its circuit at a predetermined plus water level.

Device 81 is similar to device 80; hence, corresponding parts are designated with the same reference characters with primes affixed. The switch arm 85' may be adjusted to cause switch 86' to either make or break a control circuit at a predetermined low or minus water level. As shown, arms 82 and 82' are connected by a link 88 whereby the two units 80 and 81 will operate together as required.

Figure 4:
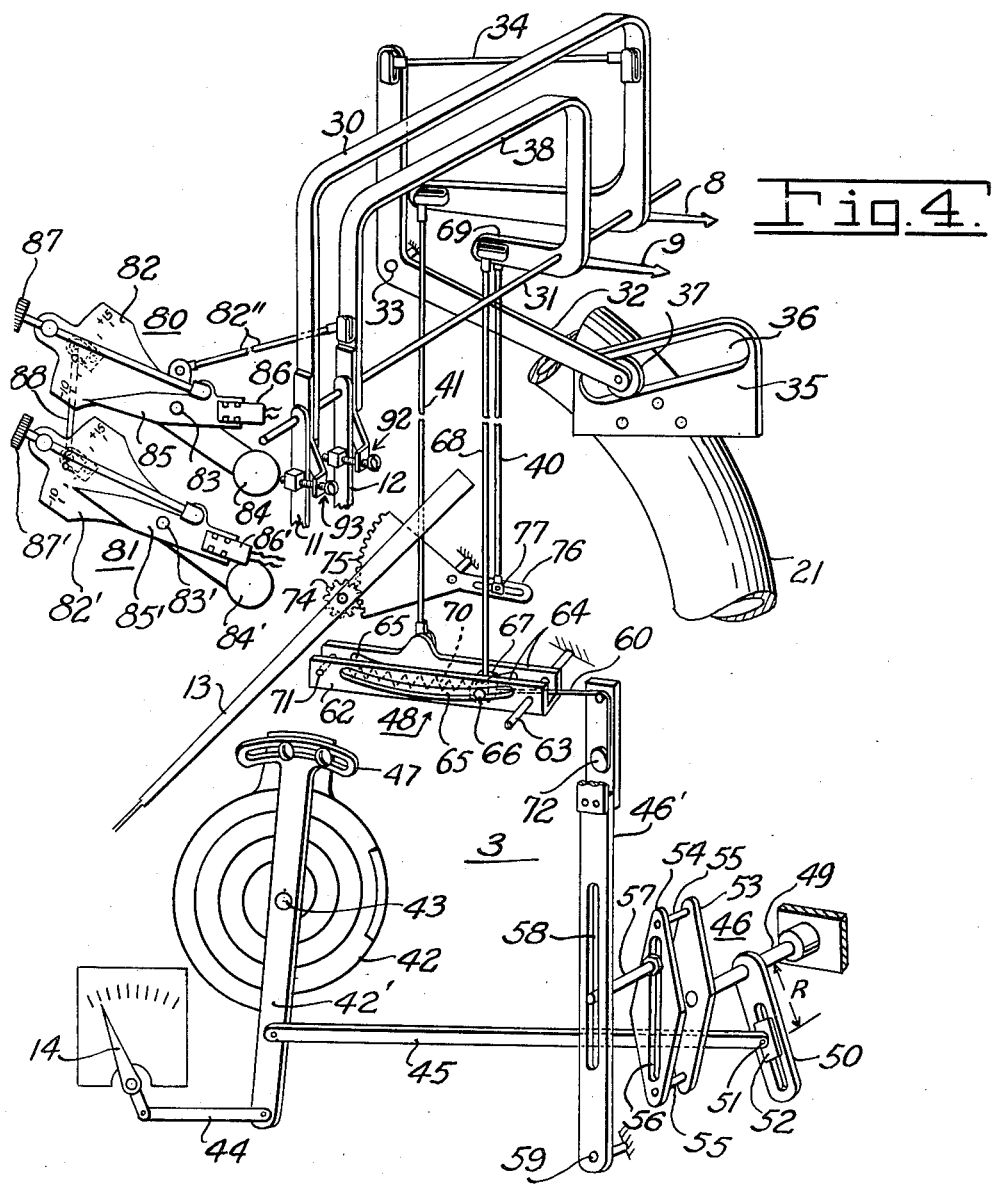
Fig. 4 is a diagrammatic view of components of the meter.
Figure 6:
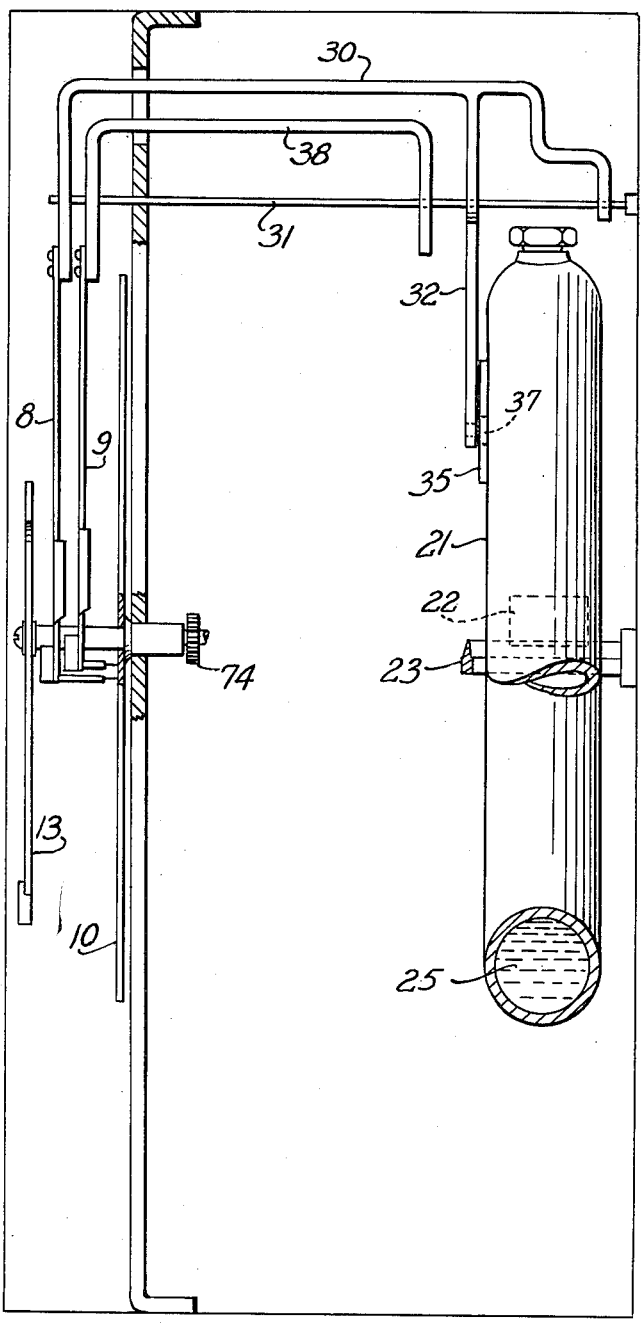
Fig. 6 is a view in section taken on line VI—VI of Fig. 5, the view being somewhat schematic and with parts removed.

As shown in Figs. 4 and 5, adjustments are provided at 90, 91, 92 and 93. Adjustment 90 makes it possible to raise or lower the free end of a crank arm 94 on beam 30 whereby through link 41 the correct position of beam 62 may be obtained at say the average boiler water level or with reference to the datum level DL. The adjustment 91 provides for adjustment of a crank arm 95 connected to drive link 40 so that the sweep of pointer 13 may be confined to the range of its scale. Adjustments 92 and 93 provide for so adjusting indicator arms 8 and 9 and pen arms 11 and 12 as to cause them to take positions with respect to check scale 7 and the chart 10 as will provide both uncorrected and corrected level indications just as they are in the boiler drum.

Fig. 4 illustrates the relative locations of ring 21, beams 30 and 38, the indicator pen arms 11 and 12, and the chart 10. This view also shows the sweep hand or pointer 13.

Operation

The foregoing description gives the construction of the gauge and the principles of its operation. It should, however, be understood that much of the construction has been shown in simplified form and borders on the schematic. Those skilled in the instrument art are familiar with the use of cone point bearings, and counterweights for beams such as the uncorrected and corrected beams 30 and 38, which weights have been omitted from the drawings in the interest of simplicity.

With the above in mind, the operation is as follows:
Assuming the boiler has been out of service but that it has been filled with water to at least the datum level DL, more water is being added and that the fire has been established. From a prior operation or from manual filling, vessel 16 is full to pipe 17. In that case ($h_o$) causes the ring 21 to rotate clockwise to its base position, weight ($W_1$) will be directly below the center of rotation of the ring, sweep pointer 13 will show a minus 15 level or less, and the check pointers 8 and 9 will substantially coincide and show the same level on check scale 7. Pen arms 11 and 12 will also show substantially the same boiler levels. As the temperature of the water in the boiler reaches steam conditions, and pressure develops, the density of the water decreases according to curves F and F'. The uncorrected pointer 8 and pen arm 11 will show a rising boiler level, but that level is not the true level corrected for decrease in density of the water.

In response to the decrease in density, tube 42 reflects the decrease and operates the radial coupling 46 in such a direction that cross head 67 is shifted along beam 62 to a position where the sweep of beam 62 about its bearing will increase the throw of corrected beam 38 in amount sufficient to position pointer 9 and pen arm 12 to a water level indication that is higher than that indicated by pointer 8 and pen arm 11. Since the throw of beam 38 also actuates the true level sweep pointer 13, that pointer will indicate true or corrected water levels.

The necessary adjustments having been made in the meter to cause the pointers 8 and 9, pen arms 11 and 12, the sweep pointer 13 and devices 80 and 81 to be in scale range for a given boiler operating condition as to steam pressure and the predetermined allowable minus and plus levels with respect to datum level DL and the average level O, the gauge will operate accurately and precisely whether a boiler is being put in operation or taken out of operation, or is in normal operation.

The foregoing description of operation as to rising boiler levels applies to decreasing levels also. As levels rise, ring rotation is from right to left, that is, counterclockwise; as levels decrease, rotation of ring 21 is from left to right, i. e. clockwise, the limit occurring when ($h_o$) is maximum and ($h_c + h_s$) is minimum or base.

Meter 6 may be located at a convenient station for ease of accessibility and observation. The distance the meter is removed from the boiler setting will not affect its operation. The volume of vessel 16 should be such that the volumes of water in the pipes to the meter and in the ring chambers do not adversely affect the maintenance of a constant level in the vessel.

The gauge above described will give a correct level reading for ($h_c$) where $h_c = \Delta h \mu f$
$h_c$ = corrected level
$h \mu$ = uncorrected level $f = \dfrac{\gamma B}{\gamma A}$ = the correction factor as derived from curve F or F' of Fig. 3

$\Delta h \mu$ = height of column sensed by the gauge
$\gamma B$ = assumed based density at any selected boiler-pressure operating condition
$\gamma A$ = the actual density existing at any particular value of $\Delta h \mu$ and boiler pressure, either or both of which vary in the normal operation of a boiler.

The base condition can be established in the gauge by (1) adjusting radial coupling 46 until the motion of lever 46' is linear with changes in the density of the water over the range of operating conditions as reflected by curves F or F'; and (2) adjusting the initial position of crosshead 62, by means of cable 60, to that required. After the initial adjustment, the only adjustment required to meet conditions is the adjustment of the crosshead 62.

Having thus described the invention, it will be apparent to those of ordinary skill in the art to which the invention pertains that various changes and modifications can be made in the illustrated embodiments as described and as shown.

Therefore, what is claimed as new and desired to be secured by Letters Patent is:

1. A water level gauge for steam boilers having a steam drum and water therein, the level of which varies, said gauge comprising a constant head liquid vessel located outside the steam drum and provided with means for connecting the upper portion of the vessel to said steam space and a conduit extending downwardly from the bottom of said vessel, the vessel being kept filled to a constant level with steam condensate, a meter comprising a hollow ring mounted for rotation about the center thereof, said ring having an internal partition at its top, a quantity of liquid heavier than water in the ring whereby the liquid and the partition divide the ring into chambers, the downwardly extending conduit being connected to one of the ring chambers, a conduit adapted to connect the other ring chamber to the boiler drum at a datum level location adjacent the bottom thereof, whereby the pressure difference ($W_2$) acting on said partition is proportional to ($h_o \times \gamma$) at $T_a°$ F., where $h_o$ is the height of the column between the level of the water in said vessel and said datum level, $\gamma$ is a function of the density of the water at ambient temperature, means exerting a counter-rotational force ($W_2$) on the ring that is proportional to the rotational force of ($h_o \times \gamma$) at $T_a°$ F., means exerting a second rotational force ($W_3$) that is proportional to ($h_s \times \gamma$) at $T_s°$ F., where ($h_s$) is the head of water between a minimum boiler water level and the datum level, means exerting a force ($W_1$) on the ring tending to urge the same to a fixed position, said force ($W_1$) being proportional to ($h_c \times \gamma$) at $T_s°$ F. where ($h_c$) is the column of water in the drum between minimum and maximum operating levels, a rotatable uncorrected water level indicator, means connecting said ring and uncorrected level indicator for positioning the latter in accordance to variations in ($W_1$) and with respect to ($h_o$) or $W_2$, a corrected water level indicator, means responsive to changes in density ($\gamma$) of the water in the boiler resulting from changes in the temperature-pressure relationship therein, a mechanism actuated by said density responsive means having a motion proportional to the water density variations, a pivotally mounted compensating member, means connecting the uncorrected level indicator to said compensating member, whereby the same is positioned in accordance with the position of the uncorrected level indicator, a cross head on and movable along said compensating member, means urging said cross head outwardly of the pivot point of said compensating member, means connecting said cross head to the mechanism actuated by said density responsive means for shiftnig the cross head towards or away from said pivot in accordance with variations in the boiler water density, and means connecting the corrected level indicator to said cross head, whereby the position of said corrected level indicator is caused to be proportional to $(h_c + h_s)$ the true and corrected water level in the boiler.

2. A gauge as in claim 1 in which the meter is provided with a pinion and a pivotally mounted lever having a gear segment meshing with the pinion, a true level indicating sweep pointer driven by the pinion and a link connecting the segment lever to said corrected level indicator, the pointer indicating true and corrected water level $(h_c + h_s)$.

3. In combination with a steam generating device having a drum containing steam and water, the water level of which is to be measured with reference to a datum level near the bottom of the drum, the heads of the water levels above the datum level being denominated minimum level $(h_s)$ having a weight $W_3$, $(h_c)$, the head between maximum and minimum drum levels and having a weight $(W_1)$ and $(h_0)$, a constant head having a weight $W_2$ and being greater than $(h_s + h_c)$, of a vessel outside the boiler drum having a connection with the steam space of the boiler at a level $(h_0)$, said vessel condensing steam at a rate sufficient to automatically maintain the level of water therein at a column height $(h_0)$ above the datum level, a pressure differential responsive means located below the datum level and connected to the bottom of said constant head vessel, a connection from the boiler drum at the datum level to said pressure differential means, whereby a force is exerted on the pressure differential means that is proportional to $(h_0 - [h_c + h_s])$, means exerting on said pressure differential means a force $(W_2)$ counter to said force $(h_0)$, means exerting on said pressure differential means a force $(W_3)$ that acts in the same direction as the force $(h_0)$, means urging said pressure differential means towards a predetermined position, an uncorrected water level indicator actuated by and in accordance with the motion of said pressure differential means in response to the said forces acting thereon, means responsive to the density of the water at the datum level as affected by the steam pressure—saturated temperature relation of the boiler water, a compensating mechanism connected to and actuated by said uncorrected level indicator, a cross head on said compensating mechanism, means urging said cross head in one direction, means connecting said density responsive means to said cross head for positioning the same in accordance with the density of the water, and a true water level indicator means connected to said cross head, the throw of the true level indicator means being proportional to the response of the pressure differential means to the uncorrected boiler water level as modified by the density factor of the water in the boiler.

4. A gauge as in claim 3 in which the meter is provided with a pinion and a pivotally mounted lever having a gear segment meshing with said pinion, a pointer driven by the pinion and a link connecting the segment lever to said corrected level indicator, the pointer being positioned to indicate true and corrected boiler water drum water level.

5. A gauge as in claim 1 having devices for regulation and low and high level alarm signaling connected to and actuated by said corrected water level indicator.

6. A combination as in claim 3 in which the pressure differential responsive means is provided with devices for regulation and low and high water level alarms signaling connected for operation by said corrected level indicator means.

References Cited in the file of this patent
UNITED STATES PATENTS

| | | |
|---|---|---|
| 2,280,325 | Vetter | Apr. 21, 1942 |
| 2,286,919 | McNeill | June 16, 1942 |
| 2,347,637 | Sprenkle | Apr. 25, 1944 |